United States Patent [19]

Brice

[11] Patent Number: 4,726,823
[45] Date of Patent: Feb. 23, 1988

[54] MOVABLE FILTER ASSEMBLY FOR AUTOMOTIVE AIR HANDLING ASSEMBLY

[76] Inventor: Patrick J. Brice, 7839 S. Newberry La., Tempe, Ariz. 85284

[21] Appl. No.: 21,198

[22] Filed: Mar. 3, 1987

[51] Int. Cl.⁴ .............................................. B01D 19/00
[52] U.S. Cl. ...................................... 55/274; 55/309; 55/502; 55/385 B; 116/268; 98/2.11
[58] Field of Search ............ 55/274, 309, 502, 385 B; 116/268; 98/2.11

[56] References Cited

U.S. PATENT DOCUMENTS

| | | | |
|---|---|---|---|
| 2,808,124 | 10/1957 | Attwood | 55/481 |
| 2,840,183 | 6/1958 | George | 55/309 |
| 3,422,791 | 1/1969 | Rosaen | 116/268 |

Primary Examiner—Bernard Nozick
Attorney, Agent, or Firm—Herbert E. Haynes, Jr.

[57] ABSTRACT

A filter assembly for an automotive air handling system includes a frame adapted for demountable attachment to the engine side of the automotive firewall, and a filter slidably received in the frame. Springs are provided at the bottom of the frame for ejecting the filter partially out of the frame so that air can bypass the filter when the filter is clogged. A latchable door covers the access opening of the frame, holding the filter down against the bias of the springs until clogging is detected by a pressure-sensitive diaphragm. The diaphragm controls a release mechanism which unlatches the door when clogging of the filter causes an increase in the differential pressure across the filter.

27 Claims, 7 Drawing Figures

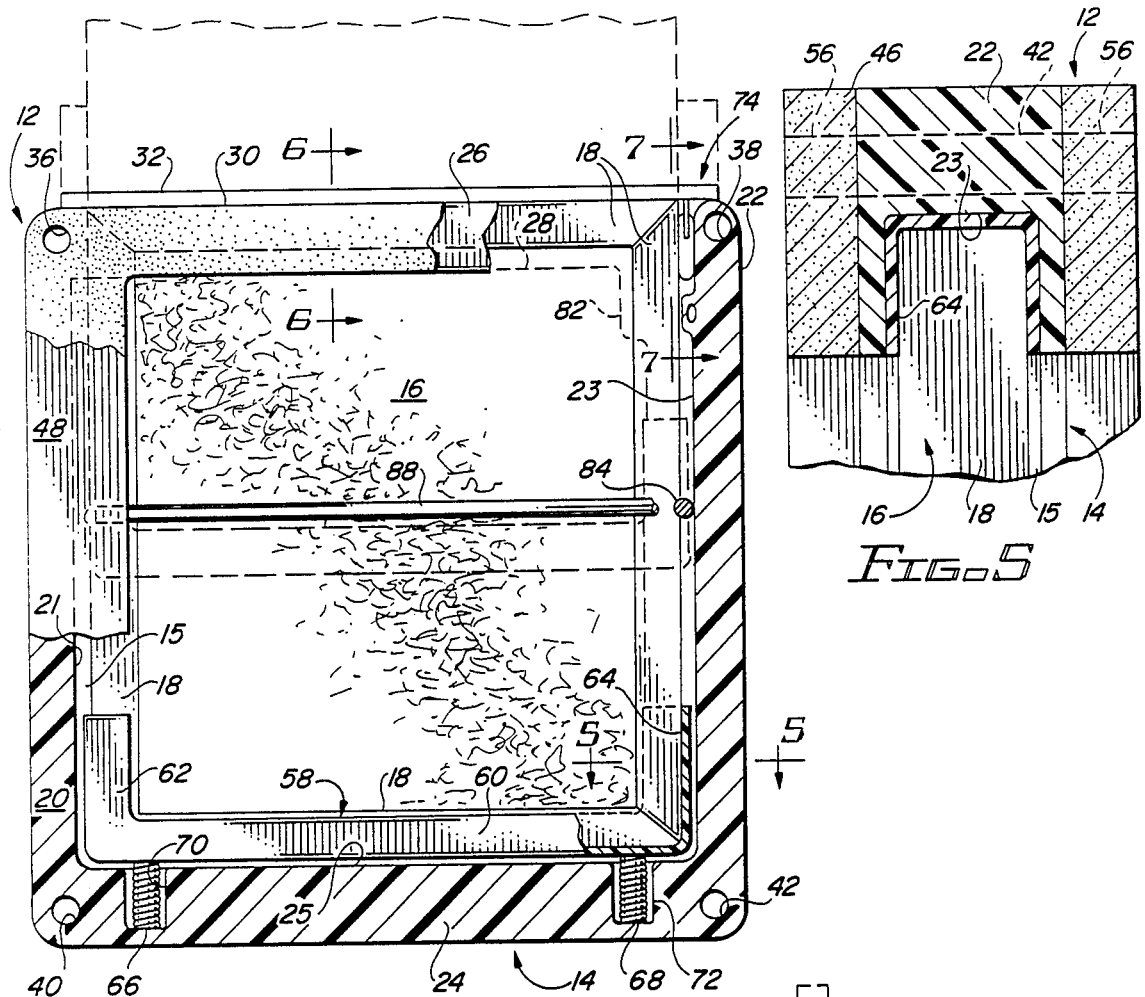
FIG-4
FIG-5
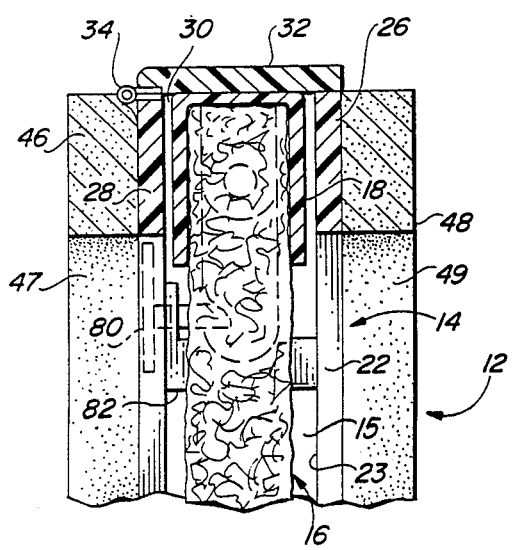
FIG-6
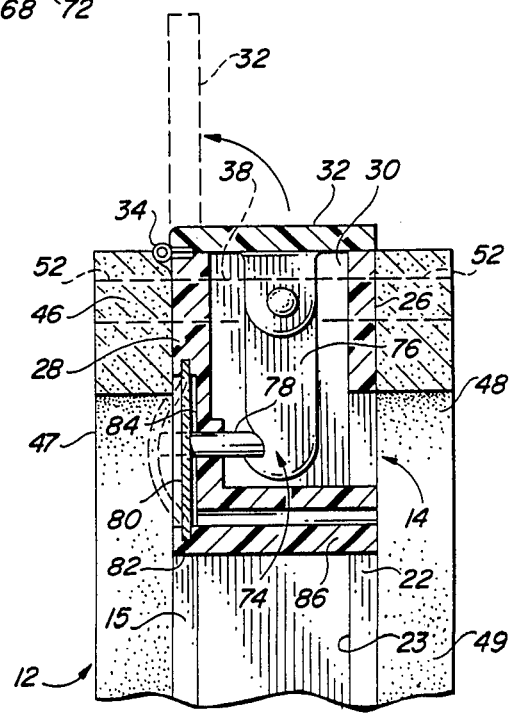
FIG-7

MOVABLE FILTER ASSEMBLY FOR AUTOMOTIVE AIR HANDLING ASSEMBLY

BACKGROUND OF THE INVENTION

1. Field of the Invention

This invention relates in general to filters for the air handling and treatment systems of automotive vehicles and, more particularly, to a filter assembly including means for moving the filter out of the flow path of the air handling system when the filter is blocked.

2. Description of the Prior Art

The air treatment and handling system of a modern automobile customarily comprises air intake means for drawing air from within the vehicle's passenger compartment as well as fresh outside air through the firewall of the vehicle and into a plenum located on the engine side of the firewall. The air is then moved through the plenum by means of a centrifugal blower which delivers the air to a chamber containing an air conditioning evaporator coil. From there, the treated air passes back through the firewall and into a distribution system carried under the dashboard of the vehicle.

It is desirable, because of the large amount of air pollution in urban environments, to provide some type of filter for removing dirt particles and other contaminants which enter the aforementioned type of air treatment and handling system. However, conventional filter elements, which merely consist of stationary screens, strainers and in some cases more exotic materials, positioned across the flow passage of the air handling system, suffer from the drawback that they tend to become clogged rather quickly, thus preventing the air from traveling through the system, and severely decreasing the efficiency of the system. When clogging occurs, the filter must be replaced or removed for cleaning. Due to the complexity and compact configurations of todays automotive air treatment and handling systems, the entire blower motor assembly and/or the instrument panel of the vehicle would need to be disassembled in order to gain access to the filter area in the absence of a unique filter and mounting arrangement. This, of course would require considerably more time and labor than the average vehicle owner would be willing to expend for a simple filter.

Several attempts have been made in the past to devise automotive air handling systems having replaceable air filters. Such attempts have been described in U.S. Pat. No. 2,203,477 to Wahlberg, U.S. Pat. No. 2,213,017 to Perkins, U.S. Pat. No. 4,610,703 to Kowalczyk, and U.S. Pat. No. 4,629,479 to Cantoni. The filter assemblies of both Wahlberg and Perkins, however, were designed for vehicle styles of the 1930's and 1940's, and simply would not fit in the more complex and compact systems of modern automobiles. The inventions of both Kowalczyk and Cantoni relate to removable filter elements for the air handling systems of modern automobiles, together with means for sensing when the filter is clogged. In the Kowalczyk patent, the sensing means is associated with indicating means such as a warning light for notifying the vehicle operator that the filter needs to be changed. In the Cantoni patent, the sensing means is associated with means for stopping the fan which circulates air through the system, and thus prevents the system from operating until the clogged filter is replaced with a clean one. In both of these cases, however, access to the filter elements is blocked by obstructions such as the blower motor, fan, evaporator coil and the like, so the process of replacing the filter is as laborious as ever. Furthermore, both the Kowalczyk and the Cantoni devices lack any type of bypass means for allowing air to blow through the system after clogging is detected. Thus, the vehicle owner is forced to put up with an inefficient or inoperative air handling system until he or she has time to buy a new filter, which may be extremely inconvenient if the owner is busy or if the correct filter is unavailable.

Other patents of interest are U.S. Patent No. 1,914,667 to Kolls, which describes a filter arrangement for a furnace, U.S. Pat. No. 2,074,152 to Mueller, which describes a filter arrangement for a household conditioning system, U.S. Pat. No. 2,811,840 to Thompson, directed to a filter for a refrigerator, and U.S. Pat. No. 4,195,383 to Leinfelt which describes a filter for a vacuum cleaner. The devices of Kolla, Mueller, and Thompson all comprise pivotably mounted filter elements which act essentially as flap valves allowing air to continue through the system even after the filters are clogged. None of these devices can be satisfactorily adapted to automotive air handling systems, however, because the crowded, compact arrangement of elements in a modern vehicle simply does not allow enough room for a pivoting type filter. The patent of Leinfelt is directed to a diaphragm-actuated means for detecting and indicating when a filter is clogged, but does not include any type of filter bypass means, and is silent as to how the filter is removed and/or replaced.

Therefore, a need exists for a new and improved filter for an automotive air handling system which overcomes some of the problems and shortcomings of the prior art.

SUMMARY OF THE INVENTION

In accordance with the present invention, a new and improved filter assembly for placement in the air flow path of an automotive air handling system is provided with means for ejecting the filter partially out of the air flow path when the filter is clogged.

The filter assembly comprises a frame suitable for demountable attachment to the engine side of an automotive firewall. The frame, which may be mounted over either the inlet opening or the outlet opening of the air handling system, or both, defines a cavity for receiving a conventional filter element. Biasing means such as springs are provided in one end of the frame for biasing the filter element towards an access opening located at the opposite end of the frame, and a latchable door is provided at the access opening for holding the filter in the frame against the bias of the biasing means until such time as a clogged condition is detected in the filter. When clogging is detected, the door is unlatched, allowing the biasing means to extend, forcing the filter element to slide along a path transverse to the air flow path of the system. When the biasing means are fully extended, the filter projects partially out of the frame so that air can bypass the filter and continue to circulate through the system. The projecting portion of the filter element provides visible indication that the filter needs to be replaced.

The means for latching and unlatching the door of the filter assembly frame comprises a hook member depending from the door of the frame and a pin member extending perpendicularly from the downstream wall of the frame to engage the hook member. The pin member is secured to the central portion of a pressure sensitive diaphragm having its peripheral edges clamped in a protruding portion of the frame. When the filter element becomes clogged, an increase in the differential pressure across the filter will cause the central portion of the diaphragm to flex away from the filter element thus pulling the pin member out of engagement with the hook member and unlatching the door. This allows the filter element to pop partially out of the frame as previously described.

Accordingly, it is an object of the present invention to provide an automotive air handling system with an easily accessible and replaceable filter assembly.

Another object of the invention is to provide a filter assembly for placement in the air flow path of an automotive air handling system with means for moving the filter element in a direction transverse to the air flow papth, allowing air to bypass the filter element when the filter element is clogged.

Still another object of the invention is to provide a frame for receiving a filter element, the frame including an access opening covered by a latchable door, and means responsive to an increase in the differential pressure across the filter element for unlatching the door when the filter element is clogged.

The foregoing and other objects of the present invention, as well as the invention itself, may be more fully understood from the following description when read in conjunction with the accompanying drawings.

BRIEF DESCRIPTION OF THE DRAWINGS

FIG. 4 is a front view, partially borken away, of the filter assembly of the present invention.

FIG. 5 is an enlarged fragmentary sectional view taken through line 5—5 of FIG. 4.

FIG. 6 is an enlarged fragmentary sectional view taken through line 6—6 of FIG. 4.

FIG. 7 is an enlarged fragmentary sectional view taken through line 7—7 of FIG. 4.

DESCRIPTION OF THE PREFERRED EMBODIMENT

Figure 1:
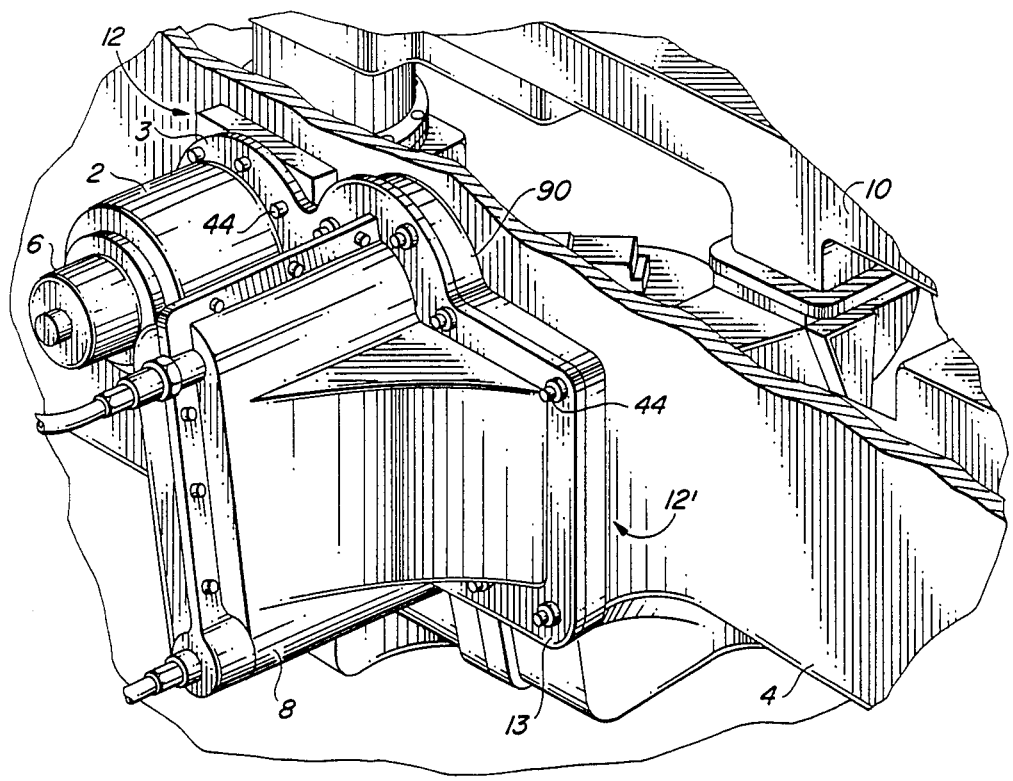
FIG. 1 is a perspective view showing a conventional automotive air handling system which has been provided with the filter assembly of the present invention.
Figure 2:
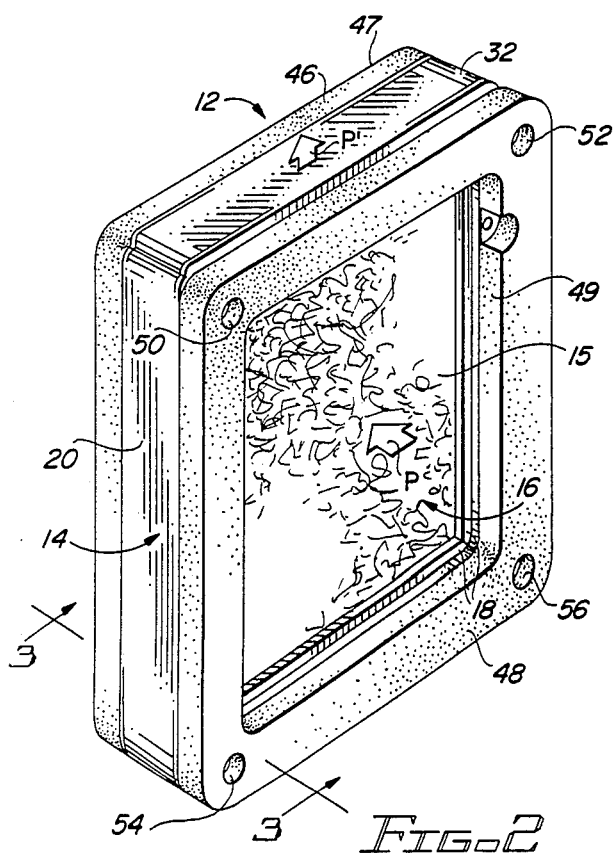
FIG. 2 is a perspective view showing the filter assembly of the present invention.
Figure 3:
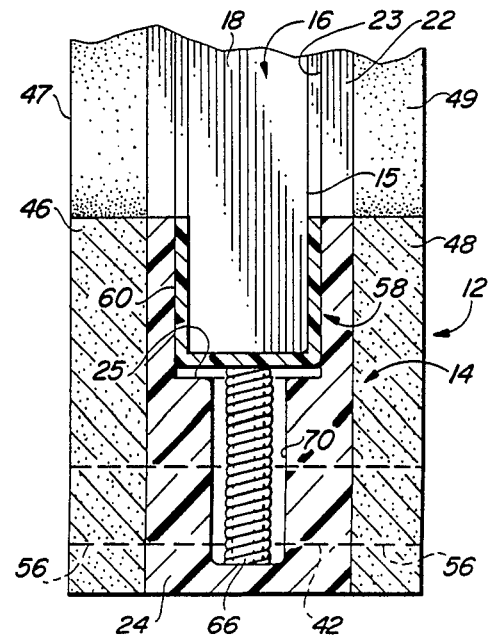
FIG. 3 is an enlarged fragmentary sectional view taken through line 3—3 of FIG. 2.

Referring more particularly to the drawings, FIG. 1 shows an air treatment and handling system which is intended to be indicative of the type conventionally used in automotive vehicles. Such a system typically comprises an air intake plenum 2 having a flange 3 which is mounted on the engine side of the firewall 4 of the vehicle so as to align with an air intake opening (not shown) provided in the firewall. Fresh outside air and air from within the vehicle's passenger compartment is selectively drawn into and moved along an air flow path P through the plenum 2 by means of a centrifugal blower 8 which supplies the air under pressure to a compartment 8 in which an air conditioning evaporator coil (not shown) is mounted. From there, the treated air passes back through an air delivery opening (not shown) provided in the firewall 4 and into a distribution system 10 carried under the dashboard (not shown) in the passenger compartment. The filter assembly of the present invention may be mounted at the inlet end of the plenum 2 of the system, between the firewall 4 and the flange 3 of the intake plenum 2, as shown at 12, or at the outlet end of the evaporated coil compartment 8, between the outlet flange 13 of the evaporator coil compartment 8 and the firewall 4, as shown at 12', or both.

The filter assembly 12 comprises a frame 14 which defines a cavity 15, and a filter element 16 mounted for slidable movement in the frame along a path P' transverse to the air flow path P of the system. The filter element 16 may be constructed from any suitable material such as wire mesh, polyurethane foam, sintered textile or glass fibers, depending on factors such as cost and the type of pollutants to be removed, and should also include a rigid casing 18 for surrounding the top, bottom, and side edges of the filter element 16 in order to prevent the filter element 16 from being crushed or losing shape.

The frame 14 of the filter assembly 12 comprises three channel members, including a first upstanding side channel member 20 defining an inwardly facing groove 21, a second upstanding side channel member 22 parallel to and spaced apart from the first channel 20 and like the first channel, defining an inwardly facing groove 23, and a bottom channel member 24 which extends perpendicularly to and joins the bottom ends of the two side channels members 20, 22, and defines an upwardly opening groove 25. In addition, a top portion including an upstream flange 26 and a downstream flange 28 extends between the top ends of the side channel members, with an access opening 30 being defined between the flanges 26, 28 for enabling the filter element 16 to be inserted and withdrawn from the central cavity 15 of the frame 14. A door or lid member 32 is pivotably mounted to the downstream flange 28 by means of a hinge 34, which enables the door 32 to be swung from a closed position as seen best in solid lines in FIG. 7, in which the free edge of the door 32 rests on upstream flange 26 of the frame 14 and access opening 30 is covered, to an open position in which access opening 30 is uncovered, as shown in phantom lines in FIG. 7.

In the illustrated embodiments, each corner of the frame 14 includes a hole 36, 38, 40, 42 for receiving fastening means 44 (FIG. 1) such as screws or bolts for demountably securing the frame 14 to the engine side of the firewall 4. In addition, a pair of gaskets are provided, including a first gasket 48 for mounting such as by means of a suitable adhesive on the downstream side 47 of the frame 14 to prevent leakage from the downstream portion of the assembly, and a second gasket 48 is similarly mounted on the upstream side 49 of the frame to prevent leakage from the upstream portion of the assembly. Both gaskets 46, 48 essentially match the size and shape of the frame 14, and are provided with holes 50, 52, 54, and 56 which align with the holes 36, 38, 40, and 42 in the frame for receiving the fasteners 44 which mount the assembly in place.

In the bottom of the cavity 15 in the frame 14 is located a saddle 58 including a horizontal channel member 60 for receiving the bottom edge of the filter element 16. and a pair of vertical channel members 62, 64 for receiving the lower side edges of the filter element 16. A pair of compression springs 66, 68 extends between the bottom channel 24 of the frame 14 and horizontal channel member 60 of the saddle 58 for biasing the saddle 58 upwardly towards the access opening 30 of the frame 14. Preferably, each of the springs 66, 68 is contained in a different one of two pockets 70, 72 formed at opposite ends of bottom channel 24 of the frame so that when the springs 66, 68 are compressed, the saddle 68 is seated, or nearly so, in the bottom channel 24 of the frame 14.

Under normal circumstances (i.e. as long as the filter element 16 remains unclogged), the filter element 16 is held down in the frame 14 against the bias of compression springs 66, 68 by means of a latching mechanism 74 which holds the lid or door 32 in the closed position. The latching mechanism 74, best seen in FIG. 7, includes a hook member 76 pivotably secured to the bottom of the door 32, and a pin member 78 which extends into cavity 15 from the downstream flange 28 of the top portion of the frame 14. The distal end of pin member 78 is disposed for locking engagement with hook member 76, and the proximal end is secured to the central portion of a flexible diaphragm 80, the peripheral edges of which are clampingly received within a suitable groove provided in a projecting portion 82 of the downstream flange 28 of the frame 14. The projecting portion 82 of the frame 14 extends inwardly into the air flow path through the filter 12 to insure that the pressure sensing capability of the diaphragm 80 is not blocked. The protruding portion 82 of the frame 14, as shown in FIG. 7, is open on the air outlet 47 of the filter assembly 12 so that the downstream side of the diaphragm 80 opens to the downstream side 47 of the frame 14. The prodruding portion 82 of the frame 14 has a wall 84 proximate the upstream side of the diaphragm 80 and a tube 86 extends from the wall 84 to the air inlet face or upstream side 49 of the frame 14. In this way, the differential pressure on the opposite sides of the filter element 16 will be sensed by the diaphragm and when that differential pressure increases above a predetermined value, indicative of a clogged filter, the diaphragm will flex to the phantom line position and thereby pull the pin 78 out of latching engagement with hook member 76.

When the door 32 is unlatched, the springs 66, 68 at the bottom of the frame 14 extend to their free length, pushing the saddle 58 upwardly until about half of the filter element 16 projects through the top access opening 30 in the frame 14, as shown in pahantom in FIG. 4. When the filter element 16 is in this position, air can bypass the filter element 16 by traveling underneath the saddle 58, thus allowing the air handling system to operate at full or nearly full capacity. In addition, the upraised position of the filter member 16 provides visual indication that the filter member 16 needs to be replaced. If desired, the casing 18 of the filter may be colored a bright shade such as red, so that anytime the vehicle owner or mechanic opens the hood of the vehicle, he or she will immediately notice if the filter has popped up. Alternatively, the unlatching mechanism 74 may be operatively connected in a known fashion to some type of switch (not shown) for actuating warning lights or an audible signal such as a buzzer in the instrument panel of the vehicle, so the driver is instantly alerted when the filter element 16 becomes clogged.

In order to prevent fumes from the engine compartment of the vehicle from entering the air handling system when the filter element 16 is in its raised position, a sealing ring 88 is carried around the central portion of the element 16 in suitable notches 84 (one shown). The position of the sealing ring 88 is carefully selected so that when the filter element 16 is in its uppermost, or released position, the sealing ring 88 is seated between the upstream and downstream flanges 26, 28 of the top of the frame 16, thus completely sealing access opening 30 and preventing air from escaping or entering the system.

It will be appreciated that the air flow openings formed through the firewall and various other structural details of the automotive vehicles will differ in size and shape from one vehicle to another and so will the hole, or stud arrays which are employed for mounting of the air treatment and handling equipment. For this reason, it will be understood that the frame, gaskets, and hole pattern configurations shown herein with regard to the filter assembly 12 are only exemplary. For example, the outlet flange 13 of the evaporator coil compartment 8 is shown as being of quadrilateral equiangular configuration. Therefore, the illustrated frame 14 of similar shape would be suitable for installation at that point in the air treatment and handling system. However, the flange 3 of the air intake plenum 2, and the fastener arrangement, is shown as being at least partially circular. Thus, the peripheral surfaces of the frame 14, and the gaskets 46 and 48, should be similarly configured, and, the hole array of the filter assembly 12, 12' will need to be arranged to match that of the existing air treatment and handling system and the vehicle in which the filter(s) are to be used. Of course, the grooves 21, 23 and 25 of the channel members 20, 22 and 24, respectively, must be linear for the required seating and sliding movement of the filter element 16, as hereinbefore described.

As previously mentioned, the filters 12 and 12' are for mounting between the flange 3 of the air intake plenum 2 and the firewall 4 and the flange 13 of the evaporator coil compartment 8. This will cause a relocation of all of the parts of the air treatment and handling system which are mounted on the engine compartment side of the firewall. It is contemplated that the thickness dimension of the filter assemblies 12 and 12' will be approximately one inch. Thus, the parts and equipment customarily mounted on the engine compartment side of the firewall 4 will be relocated approximately one inch or so further into the engine compartment.

When both filters 12 and 12' are used, a suitable spacer 90 (FIG. 1) may be provided between the two filters to insure a flush and solid mounting of the plenum 2 and evaporator coil housing 8. The spacer 90 may be a separate element or could be formed as an integral interconnecting part of the frames 14 of the two filters 12 and 12'. If only one of the other of the filters 12 and 12' are to be used, the spacer could be formed accordingly, that is, one or the other side of the structure would be a "dummy" filter frame.

While the principles of the invention have now been made clear in the illustrated embodiments, there will be immediately obvious to those skilled in the art, many modifications of structure, arrangements, proportions, the elements, materials and components used in the practice of the invention and otherwise, which are particularly adapted for specific environments and operation requirements without departing from those principles. The appended claims are therefore intended to cover and embrace any such modifications within the limits only of the true spirit and scope of the invention.

What is claimed is:

1. A filter assembly for use in an automotive air handling system, said filter assembly comprising:
    (a) frame means for mounting in the air handling system, said frame means defining an air flow path and having an air inlet face and an air outlet face;
    (b) a filter element means mounted in said frame means for movement in a plane transverse to the air flow path defined by said frame means, said filter element means being movable from a first position wherein it completely spans the air flow path of said frame means to a second position wherein it is at least partially out of the air flow path defined by said frame means;

(c) biasing means mounted in said frame means for yieldably urging said filter element means to its second position;

(d) latching means on said frame means for releasably holding said filter element means in its first position against the bias applied thereon by said biasing means; and (e) sensor means on said frame means and coupled to said latching means for releasing said latching means upon sensing of a clogged condition of said filter element means.

2. The filter of claim 1 and further comprising said filter element means including an air filtering medium having a substantially rigid frame.

3. The filter of claim 1 and further comprising:
(a) a pair of gaskets one of which is mounted on the air inlet face of said frame means with the other being mounted on the air outlet face thereof; and
(b) said frame means and said pair of gaskets being configured to substantially match the configuration of one of the air passage openings formed in the firewall of an automobile through which the air handled by the automotive air handling system passes for mounting of said filter assembly at that air passage opening.

4. The filter assembly of claim 1 wherein said frame means comprises:
(a) a spaced apart pair of parallel side channel members each defining an inwardly facing groove in which the opposite side edges of said filter element are disposed and slidably movable;
(b) an end channel member interconnectingly extending between an aligned pair of ends of said pair of side channel members and defining an inwardly facing groove; and
(c) flange means interconnectingly extending between an opposite aligned pair of ends of said pair of side channel members and defining an access opening therebetween through which said filter element means is movable.

5. The filter assembly of claim 4 wherein said latching means comprises:
(a) door means hingedly mounted on said flange means for movement between a first position wherein said access opening defined by said flange means is closed and a second position wherein said access opening defined by said flange means is open; and
(b) hook means pivotably attached to said door means and having a first position wherein said door means is held in its closed position and a second position wherein said door means is free to open.

6. The filter assembly of claim 5 wherein said biasing means is disposed in the inwardly facing groove of said end channel member so as to be in bearing engagement with said filter element means to bias said filter element means into engagement with said door means when said door means is in its closed position and for at least partially ejecting said filter element means out of the air flow path of said frame means through the access opening of said flange means when said door means is in its openable position.

7. The filter assembly of claim 6 wherein said biasing means comprises:
(a) a saddle member for engaging said filter element means, said saddle member being located proximate the inwardly facing groove of said end channel member: and
(b) at least one compression spring extending from said saddle member into the inwardly facing groove of said end channel member.

8. The filter assembly of claim 5 wherein said sensor means comprises:
(a) pin movable means having a first position wherein it is in latching engagement with said hook means to hold said hook means in its first position and having a second position wherein it is out of latching engagement with said hook means to provide the second position of said hook means: and
(b) means responsive to the differential pressure on the air inlet face and the air outlet face of said frame means for moving said pin means from its first position to its second position when the differential pressure increases above a predetermined value indicative of clogging of said filter element means.

9. The filter assembly of claim 8 wherein said means responsive to the differential pressure comprises:
(a) a protruding member formed on said frame means and disposed to protrude into the air flow path defined by said frame means, said protrusion member defining a chamber which opens onto the air inlet face and onto the air outlet face of said frame means;
(b) a diaphragm mounted in said chamber of said protruding member, said diaphragm having one surface which faces the air inlet face of said frame means and an opposite surface which faces the air outlet face of said frame means, said diaphragm being flexibly movable toward said air outlet face of said frame means when the differential pressure across said diaphragm increases above a predetermined value; and
(c) said pin means being mounted on said diaphragm for movement therewith.

10. An automotive air handling system comprising in combination:
(a) an automotive vehicle having a firewall with an air intake opening and an air delivery opening formed therein;
(b) a portion of the automotive air handling system being mounted on the engine compartment side of said firewall, said portion including an air moving mechanism having an inlet which is coupled to the air intake opening of said firewall and having an outlet which is coupled to the air delivery opening of said firewall;
(c) an air filter assembly interposed between the inlet of said air moving mechanism and said air intake opening of said firewall, said air filter assembly including.
i. a frame means defining an air flow path and having an air inlet face and an air outlet face.
ii. a filter element means in said frame means for movement in a plane transverse to the air flow path of said frame means between a first position wherein it spans the air flow path of said frame means and a second position wherein it is at least partially out of the air flow path of said frame means, iii. biasing means in said frame means for yieldably urging said filter element means to its second position, iv. latching means on said frame means for releasably holding said filter element means in its first position against the bias applied thereon by said biasing means, v. sensor means on said frame means for releasing said latching means upon sensing of a clogged condition of said filter element means.

11. The automotive air handling system of claim 10 and further comprising said filter element means including an air filtering medium having a substantially rigid frame.

12. The automotive air handling system of claim 10 and further comprising:
    (a) a first gasket interposed between the air inlet face of said frame means and said firewall; and
    (b) a second gasket interposed between the air outlet face of said frame means and the inlet of said air moving mechanism.

13. The automotive air handling system of claim 10 wherein said frame means of said filter assembly comprises:
    (a) a spaced apart pair of parallel side channel members each defining an inwardly facing groove in which the opposite side edges of said filter element are disposed and slidably movable;
    (b) an end channel member interconnectingly extending between an aligned pair of ends of said pair of side channel members and defining an inwardly facing groove; and
    (c) flange means interconnectingly extending between an opposite aligned pair of ends of said pair of side channel members and defining an access opening therebetween through which said filter element means is movable.

14. The automotive air handling system of claim 13 wherein said latching means of said filter assembly comprises:
    (a) door means hingedly mounted on said flange means for movement between a first position wherein said access opening defined by said flange means is closed and a second position wherein said access opening defined by said flange means is open; and
    (b) hook means pivotably attached to said door means and having a first position wherein said door means is held in its closed position and a second position wherein said door means is free to open.

15. The automotive air handling system of claim 14 wherein said biasing means of said filter assembly is disposed in the inwardly facing groove of said and channel member so as to be in bearing engagement with said filter element means to bias said filter element means into engagement with said door means when said door means is in its closed position and for at least partially ejecting said filter element means out of the air flow path of said frame means through the access opening of said flange means when said door means is in its openable position.

16. The automotive air handling system of claim 15 wherein said biasing means of said filter assembly comprising:
    (a) a saddle member for engaging said filter element means, said saddle member being located proximate the inwardly facing groove of said end channel member; and
    (b) at least one compression spring extending from said saddle member into the inwardly facing groove of said end channel member.

17. The automotive air handling system of claim 14 wherein said sensor means of said filter assembly comprises:
    (a) movable pin means having a first position wherein it is in latching engagement with said hook means to hold said hook means in its first position and having a second position wherein it is out of latching engagement with said hook means to provide the second position of said hook means: and
    (b) means responsive to the differential pressure on the air inlet face and the air outlet face of said frame means for moving said pin means from its first position to its second position when the differential pressure increases above a predetermined value indicative of clogging of said filter element means.

18. The automotive air handling system of claim 17 wherein said means responsive to the differential pressure of said filter assembly comprises:
    (a) a protruding member formed on said frame means and disposed to protrude into the air flow path defined by said frame means, said protrusion member defining a chamber which opens onto the air inlet face and onto the air outlet face of said frame means;
    (b) a diaphragm mounted in said chamber of said protruding member, said diaphragm having one surface which faces the air inlet face of said frame means and an opposite surface which faces the air outlet face of said frame means, said diaphragm being flexibly movable toward said air outlet face of said frame means when the differential pressure across said diaphragm increases above a predetermined value: and
    (c) said pin means being mounted on said diaphragm for movement therewith.

19. An automotive air handling system comprising in combination:
    (a) an automotive vehicle having a firewall with an air intake opening and an air delivery opening formed therein;
    (b) a portion of the automotive air handling system being mounted on the engine compartment side of said firewall, said portion including an air moving mechanism having an inlet coupled to the air intake opening of said firewall and having an outlet coupled to the air delivery opening of said firewall;
    (c) an air filter assembly interposed between the outlet of said air moving mechanism and air delivery opening of said firewall, said air filter assembly including.
        i. a frame means defining an air flow path and having opposed planar faces,
        ii. a filter element means in said frame means for movement in a plane transverse to the air flow path of said frame means between a first position wherein it spans the air flow path of said frame means and a second position wherein it is at least partially out of the air flow path of said frame means,
        iii. biasing means in said frame means for yieldably urging said filter element means to its second position,
        iv. latching means on said frame means for releasably holding said filter element means in its first position against the bias applied thereon by said biasing means, v. sensor means on said frame means for releasing said latching means upon sensing of a clogged condition of said filter element means.

20. The automotive air handling system of claim 19 and further comprising said filter element means including an air filtering medium having a substantially rigid frame.

21. The automotive air handling system of claim 19 and further comprising:
   (a) a first gasket interposed between said frame means and the outlet of said air moving mechanism; and
   (b) a second gasket interposed between said frame means and said firewall.

22. The automotive air handling system of claim 19 wherein said frame means comprises:
   (a) a spaced apart pair of parallel said channel members each defining an inwardly facing groove in which the opposite side edges of said filter element are disposed and slidably movable;
   (b) an end channel member interconnectingly extending between an aligned pair of ends of said pair of side channel members and defining an inwardly facing groove; and
   (c) flange means interconnectingly extending between an opposite aligned pair of ends of said pair of side channel members and defining an access opening therebetween through which said filter element means is movable.

23. The automotive air handling system of claim 22 wherein said latching means comprises:
   (a) door means hingedly mounted on said flange means for movement between a first position wherein said access opening defined by said flange means is closed and a second position wherein said access opening defined by said flange means is open; and
   (b) hook means pivotably attached to said door means and having a first position wherein said door means is held in its closed position and a second position wherein said door means is free to open.

24. The automotive air handling system of claim 23 wherein said biasing means is disposed in the inwardly facing groove of said end channel member so as to be in bearing engagement with said filter element means to bias said filter element means into engagement with said door means when said door means is in its closed position and for at least partially ejecting said filter element means out of the air flow path of said frame means through the access opening of said flange means when said door means is in its openable position.

25. The automotive air handling system of claim 24 wherein said biasing means comprises:
   (a) a saddle member for engaging said filter element means, said saddle member being located proximate the inwardly facing groove of said end channel member; and
   (b) at least one compression spring extending from said saddle member into the inwardly facing groove of said end channel member.

26. The automotive air handling system of claim 23 wherein said sensor means comprises
   (a) pin means having a first position wherein it is in latching engagement with said hook means to hold said hook means in its first position and having a second position wherein it is out of latching engagement with said hook means to provide the second position of said hook means; and
   (b) means responsive to the differential pressure across the opposed planar faces of said frame means for moving said pin means from its first position to its second position when the differential pressure increases above a predetermined value indicative of clogging of said filter element means.

27. The automotive air handling system of claim 26 wherein said means responsive to the differential pressure comprises:
   (a) a protrusion member formed on said frame means and disposed to protrude into the air flow path defined by said frame means, said protrusion member defining a chamber which opens oppositely onto the opposed planar faces of said frame means;
   (b) a diaphragm mounted in the chamber of said protruding member, said diaphragm having one surface which faces the one of said planar faces of said frame means which is proximate the outlet of said air moving mechanism and having an opposite surface which faces the opposite planar face of said frame means, said diaphragm being flexibly movable toward said opposite planar face of said frame means when the differential pressure across said diaphragm increases above a predetermined value; and
   (c) said pin means being mounted on said diaphragm for movement therewith.

* * * * *